United States Patent Office 3,173,318
Patented Mar. 16, 1965

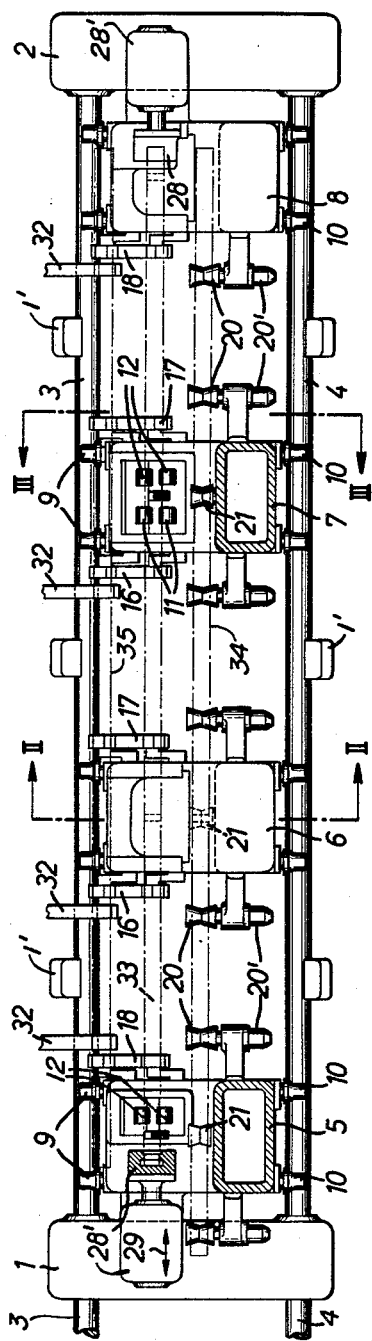

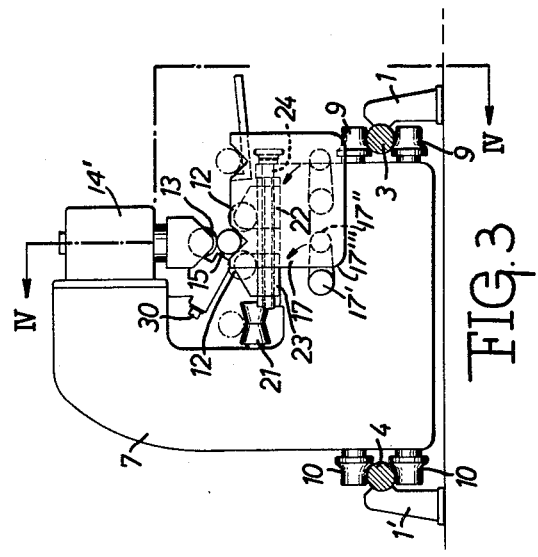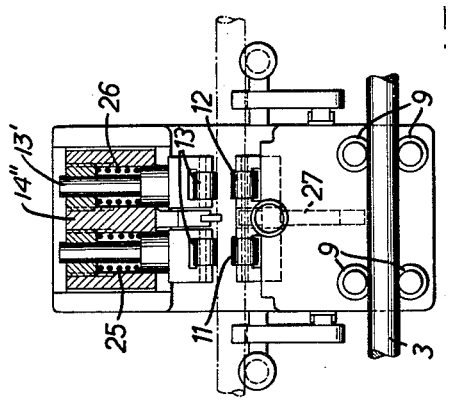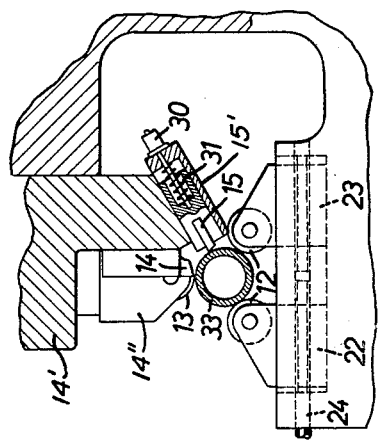

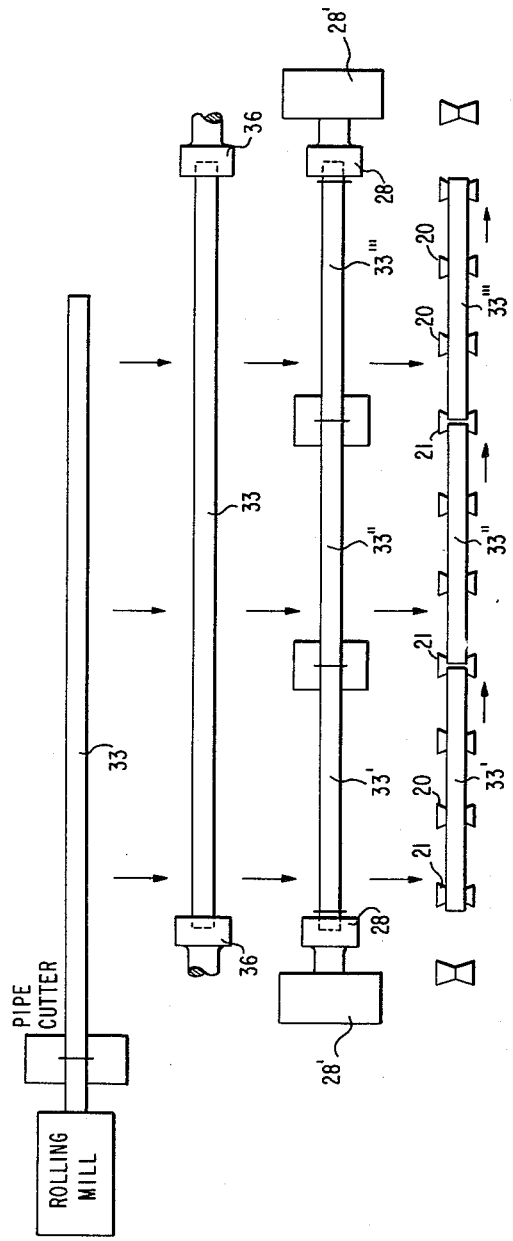

3,173,318
METHOD AND APPARATUS FOR PRODUCING PIPES OF SHORTER LENGTHS FROM A CONTINUOUSLY PRODUCED PIPE
Hans Lindemann, Bielefeld, Germany, assignor to Th. Calow & Co., Bielefeld, Germany
Filed Sept. 28, 1959, Ser. No. 842,644
Claims priority, application Germany, Oct. 1, 1958, C 17,589
4 Claims. (Cl. 82—47)

The present invention relates to an improved method of producing pipes of a relatively short length from a continuously produced pipe by dividing the same into sections, and it further relates to a severing mechanism for carrying out the new method.

Pipes are usually furnished by their manufacturing plants in relatively short sections of, for example, five to eight meters, because of the difficulty of transporting longer pipes. Such short pipes are generally produced by being severed from a pipe which continuously emerges from a rolling mill or pipe welding plant in which it is produced.

The rate of production of modern pipe rolling mills increases constantly; it presently amounts to as much as 5 meters per second and it may be expected to increase still further due to modern developments. Unfortunately, however, the greater the rate of production of the pipe-making plants and thus of the speed at which a continuous pipe is ejected from such a plant, the greater is the difficulty of dividing such a pipe into relatively short sections while its production continues constantly, entirely apart from the difficulty of severing the pipe in such a manner that the ends of the individual pipe sections will at the same time be machined so as to be ready to be screw-threaded.

If the cutting or other severing mechanism which is applied for dividing a continuously produced pipe into sections of commercial lengths is of the type which is moved with the pipe during the severing operation and is provided, for example, with circular saws, grinding disks, or the like which are movable in a direction transverse to the direction of movement of the mechanism carrying the same, it is possible to carry out neat cuts and to avoid any deformations of the pipe ends. It is, however, practically impossible to apply such severing mechanisms of known designs if the rate of speed at which the pipe is ejected from the rolling mill or similar pipe-making plant is very high. In such cases, it has therefore so far been necessary to carry out the separation of the continuous pipe into relatively short pipe sections by flying shears or similar quick-acting means. This, however, necessarily resulted in a deformation of the ends of these pipe sections which required that each individual section had to be subsequently shortened by cutting off its deformed ends which then had to be discarded as waste. This subsequent cutting process was also used to chamfer the pipe sections at the same time. It is evident from the above that it was unavoidable with the known methods of producing pipes of commercial lengths at a high delivery speed of the continuous pipe that a very considerable part of the latter was completely wasted because of the necessity of cutting off the deformed ends of each pipe section.

It is an object of the present invention to overcome this deficiency, especially since it becomes increasingly serious as the rate of production of pipe-making machines increases. For this purpose, the invention provides a new method of producing pipe sections of commercial lengths which essentially consists in first cutting off the pipe emerging continuously from the pipe-making plant, such as a rolling mill, a pipe welding plant or the like, when it has reached a length amounting to a multiple of the desired length of the pipe sections, in then passing such length of pipe in a direction transverse thereto to a severing mechanism which divides it into sections of the required length, and in finally discharging these sections from this machine by moving them in the transverse direction. While in the previous method as above-described the ends of each individual short pipe section had to be cut off as they were deformed by being hacked off the continuous pipe, it is now only necessary to cut off and discard the deformed ends of the undivided, relatively long pipe after the same has been severed quickly from the continuous pipe. Obviously, the amount of waste in pipe material accruing according to the new method is therefore very small as compared with the amount which accrued with the previous methods.

Another important object of the invention consists in increasing the rate of production of finished pipe sections of any required length by subjecting the much longer pipe, rather than the pipe sections themselves, to a pressure test. This is carried out after the long pipe has been quickly cut off the continuous pipe and before its two deformed ends are removed and it is simultaneously severed into sections.

The present invention therefore also provides for the arrangement of a pipe-testing apparatus in a position parallel to that in which long pieces of pipe are cut off quickly at regular intervals from the continuous pipe emerging from the pipe making machine, for testing such long pipes for possible leaks, and it further provides for the arrangement of a pipe dividing machine in a position laterally of this pipe testing apparatus so as to permit the long, just tested pipe to be transferred thereto in a direction transverse to its axis.

The method according to the invention, the machinery and apparatus which are specially designed to carry out this method, and the inventive arrangement of the various elements of the entire machine plant relative to each other all lead together to the result of permitting an almost unlimited increase in the rate of pipe production, for example, of a rolling mill, over the rate previously permissible, and of rendering the operation of such a plant much more efficient and economical. Such an increase is now possible since at any rate of speed at which a new length of pipe emerges from the rolling mill and is then quickly cut off, the length of time required to form such a long pipe is always adequate to permit the operation of severing the pipe into shorter sections and of chamfering these sections to be carried out properly.

Assuming, for example, that the rate of production of a pipe rolling mill is increased to twice the maximum rate presently possible, that is, to 10 meters per second, a pipe of 100 m. length will be produced at every ten seconds. This pipe will then be cut off quickly from the running pipe, be subjected to a pressure test, and divided into ten or twelve sections, which may even be chamfered, each step being performed within the period in which the next hundred-meter length of pipe is advanced. Even the removal of the finished pipe sections may be easily carried out within this period. If the rate of production of pipe rolling mills or similar pipe-making plants is still further increased, it is merely necessary to increase the length of pipe which is cut off quickly from the running pipe and to increase the distance between the sealing heads of the associated pipe testing press, and to provide the pipe dividing machine with a greater number of severing units or, if necessary, with two of such dividing machines parallel to each other.

Insofar as the dividing or severing machine is concerned, it constitutes another important feature of the invention that the means for securing the long undivided pipe at both sides of each point where it is to be severed are all designed in the form of chucking devices which open in a direction toward the side from which the pipe enters the machine. It is advisable more particularly to design these chucking devices in the form of rollers which are arranged in pairs to support the undivided pipe and of other pairs of rollers which are adapted to reciprocate relative to the supporting rollers and to press the pipe against the latter. The tools for severing the ends of the undivided pipe, that is, the ends which are deformed by the previous operation when the long pipe was pinched off quickly from the continuously produced pipe, are each preferably associated with a collet chuck or the like which at least prevents the pipe from shifting in the longitudinal direction, but may also be used as driving means for rotating the pipe while it is being cut into sections. It is, however, advisable to drive the pipe primarily by means of at least some of the rollers.

In order to permit a severing mechanism of this kind to be used for severing pipes of different diameters it is further advisable not only to provide means for adjusting the relative distance between the pipe-supporting rollers and the rollers which press the pipe to be divided upon these supporting rollers and which are adapted to be retracted from the latter to permit the finished pipe sections to be removed and a new undivided pipe to be inserted, but also to provide means for adjusting the normal distance between the supporting rollers of each set. Furthermore, it is advisable to make each cutting or other severing tool adjustable relative to the supporting rollers or the slide carrying the same, preferably by making the stroke of the tool slide adjustable as well as the position of the tool within the tool slide. The most suitable arrangements consists in mounting the tools and rollers for each dividing point on separate slide members and in connecting the respective slide members with each other by means of a spindle which is adapted to be driven so as to permit a simultaneous adjustment of all of the slide members which serve the same purpose at the different severing points. Each individual setting spindle may then be driven by a separate motor or all of the spindles may be driven by the same motor.

These and additional objects, features, and advantages of the present invention will become further apparent from the following detailed description thereof, particularly when the same is read with reference to the accompanying drawings which illustrate diagrammatically one preferred embodiment of a severing machine which is designed for carrying out the inventive method, and in which—

FIGURE 1 shows a plan view, partly in cross section, of the severing machine according to the invention;

FIGURE 2 shows a cross section taken along line II—II in FIGURE 1;

FIGURE 3 shows a plan view of one of the slide members, as seen in the direction of the arrows III—III in FIGURE 1; while FIGURE 4 shows a cross section taken along line IV—IV in FIGURE 3.

FIGURE 5 represents a flow diagram of the progress of the pipe from the pipe severing machine to the final conveying rollers.

Referring to the drawings, the pipe dividing or severing machine according to the invention comprises a frame consisting of two bearing blocks 1 and 2, a pair of guiding and supporting bars 3 and 4 connecting these blocks, and a plurality of intermediate bearing brackets 1', as shown particularly in FIGURE 3, for additionally supporting the two bars 3 and 4. As indicated at one side of FIGURE 1, bars 3 and 4 may be of a great length, and one or both bearing blocks 1 and 2 may be adjusted thereon to extend the length of the machine to any desired size. Bars 3 and 4 carry slide elements 5, 6, 7, and 8 which are movable thereon by means of rollers 9 and 10 or the like and are adapted to be locked to bars 3 and 4 in any desired position by conventional means in accordance with the length of the pipe sections to be produced. Such conventional means may consist of clamping means serving to increase the frictional engagement of the rollers 9 or 10, or of a gear rack mechanism including a gear associated with each of the slide elements 5 to 8 and a rack device engaged by such gears.

Frame 1 to 4 is adjusted to a length substantially in accordance with the length of the pipe to be severed into sections, which length previously has been hacked or chopped off, by an appropriate chopping tool from the continuously running pipe produced by the rolling mill or other pipe-making machine. Thus it is assumed of the machine shown in the drawings that it is to take up a pipe of a considerable length which is to be severed into three pipe sections and from which at the same time the two ends are to be removed which were deformed when the pipe was hacked or chopped off the continuously produced pipe. The machine may, however, also be made of a length so as to take up a pipe of a still greater length which is to be served, for example, into five sections, in which event six slide elements with the required tools and other parts thereon are to be provided. If the individual pipe sections to be attained should be of a considerable length, it may be advisable to provide an additional conveying element between each pair of adjacent slide elements for supporting the pipe at these points and for assisting in the removal of the finished pipe sections from the machine.

Each slide element 6 and 7 carries two pairs of rollers 11 and 12 for supporting and preferably also for driving the pipe to be divided by suitable driving means, for example, a motor drive gear 27', 27, 27'' as indicated in FIGURE 4. The slide elements 5 and 8 are provided with only a single pair of rollers 12. Another pair of rollers 13 acts upon the pipe from above to press the same into engagement with the lower rollers 11 and 12. A cutting tool such as that shown in FIGURE 2 by reference numeral 14 or any other suitable tool known for this purpose is disposed within a central plane between the two rollers 13 and opposite to rollers 11 and 12, while a chamfering blade 15 differing from cutting tool 14 is disposed within the same central plane and at one side between rollers 11, 12, and rollers 13. Both the cutting tool 14 and the chamfering blade are mounted on the respective slide elements 5 to 8 on a slide 14' which is movable vertically in a radial direction relative to the axis of the pipe to be cut. The stroke of tool slide 14' which also carries pressure rollers 13 is adjustable in a manner as known in many other machine tools to permit pipes of different diameters as well as different wall thicknesses to be cut. Such an adjustment of the tool slide 14' could be accomplished by known mechanisms such as a spindle of the type referred to above in another connection. Alternatively, teeth could be cut in rack fashion into the surface of the tool slide 14' so that by providing a driving gear in engagement with the rack, the rack might be moved up and down. Such rack mechanism could be mounted in an appropriate housing, for example, the housing 7 shown in FIGURE 3. The tool holder of chamfering blade 15 is slidable within a housing 15' which is secured to the downwardly projecting end of tool slide 14', and the tool holder is urged forwardly toward the pipe which is to be chamfered at the edges cut by cutting tool 14 by a spring 31 contained within housing 15'. An electromagnet 30 at the rear end of housing 15' is adapted to retract the tool holder with chamfering blade 15 against the action of spring 31. When rollers 13 are first moving downwardly and as soon as cutting tool 14 has reached a certain cutting depth, a timing relay, not shown, is operated to deenergize electromagnet 30 whereby the tool holder of chamfering blade 15 will be released so that the latter will then be forced by spring 31 against the pipe to chamfer the edges of the cut produced in the pipe immediately prior hereto. As soon as cutting tool 14 has cut through the pipe, chamfering blade 15 is again withdrawn from the pipe by magnet 30, and tool holder 14' together with cutting tool 14, chamfering blade 15, and pressure rollers 13 are moved upwardly. In order also to permit an adjustment of cutting tool 14 relative to the position of chamfering blade 15, the cutting tool is secured in a tool holder 14'' which, in turn, is adjustably secured in tool slide 14'.

As illustrated in FIGURE 2, the distance between the supporting rollers 12 of each pair may be varied by means of a spindle 24 with right-hand and left-hand threads which is adapted to adjust the two slides 22 and 23 which carry these rollers. Rollers 12 may thus be adapted to different diameters of the pipes to be divided into sections. The distance between rollers 11 is similarly adjustable. If desired, spindles 24 of all slide elements 5 to 8 may be connected so as to be driven simultaneously. While the supporting rollers 11 and 12 of each pair are nonresiliently mounted on slides 22 and 23, the pressure rollers 13 which are mounted on tool slide 14' are acted upon by springs 25 and 26 so as to be able to yield resiliently in the radial direction of the pipe to be cut. Thus, after the cutting and chamfering operations have been completed and chamfering blade 15 has been retracted by magnet 30, and while tool slide 14' is being retracted, pressure rollers 13 will, under the action of springs 25 and 26, remain for a certain length of time in engagement with the finished pipe sections since these rollers are disposed laterally of the plane of each cutting tool 14 and chamfering blade 15 and thus also laterally of the cut separating the individual pipe sections. Tool slide 14' is then drawn upwardly together with pressure rollers 13 and far enough to permit the finished pipe sections to be removed from supporting rollers 11 and 12 and a new pipe to be deposited thereon for the next cutting operation, preferably after the same has been tested for leaks.

This depositing and removal operation is carried out by lifting bars 16, 17, and 18. While lifting bars 16 and 17 are mounted at both sides of each of the two central slide elements 6 and 7, each of the two outer slide elements 5 and 8 only carries a single lifting bar 18 at the side facing toward the two central slide elements. These lifting bars are adapted to be swiveled by suitable means such as a crank mechanism so as to lift the finished pipe sections from supporting rollers 11 and 12 and to deposit them upon conveying rollers 20 and 21 which are likewise mounted on slide elements 5 to 8 and extend parallel to rollers 11, 12, and 13. The swiveling movement of the lifting bars 16 to 18 may be accomplished by cranks. Each crank consists of pivots 17' and 17'' connected with each other by a cheek 17'''. Pivot 17' is mounted in the case of the species shown by FIGURE 3 at the housing 7, while pivot 17'' is mounted at the lifting bar 17. When these crank elements are rotated about the pivot point 17' in the direction shown by the arrow, the lifting bar 17 will rise. The relationship between a crank, the contiguous lifting bar and the appropriate housing may be clearly seen in FIGURE 1 in which such cranks are viewable directly to the left of the lifting bars 17. Similarly, lifting bars 16 and 17 also transfer a new pipe from a stand-by position to rollers 11 and 12. Conveying rollers 20 and 21 are adapted to support the finished pipe sections and to convey the same from the machine in a manner as later described.

Each of the two outer slide elements 5 and 8, which is only provided with one pair of supporting rollers 12 and one pressure roller 13, is associated with a chuck 28 which is rotatably mounted coaxially with pipe 33 and adapted to reciprocate in the axial direction as indicated in FIGURE 1 by the arrow 29. One or both of these chucks 28 may also be driven, for example, by motors 28'. The chucks 28 are adapted to be slid in such direction as to receive the ends of the pipe 33, the respective ends being inserted into the spaced chucks 28 only when the pipe 33 is in the position in which its longitudinal axis is identical with the pivot axis of both chucks. Therefore, only when the pipe to be cut into several individual parts has been moved transversely to this position between the chucks 28 are the chucks slid upon the pipe ends. However, in this position of the pipe it may be alternatively slid into a stationary chuck and thereafter the other chuck may be slid onto the other ends.

In order to carry out the method of production of pipes of commercial lengths as economically as possible, it is advisable to subject each long pipe immediately after being hacked or chopped off the continuously running pipe emerging from the rolling mill or other pipe-making machine to a pressure test to examine it for leaks. This is preferably carried out by a machine as disclosed in my copending application Serial No. 842,699, now Patent No. 3,058,337, issued Oct. 16, 1962 filed on even date herewith and entitled "Hydraulic Pipe Testing Press." This machine is mounted parallel to the running pipe emerging from the rolling mill or similar machine so that, as soon as the running pipe has reached the desired length and is then hacked or chopped off, suitable conveying means pass the severed pipe in a transverse direction to the pipe testing press. The pipe dividing machine according to the invention is also preferably mounted parallel to the pipe testing press so that, immediately after being tested, the pipe may be transferred to the adjacent dividing machine by suitable transverse conveying means, represented in FIGURE 1 by guide rails 32, at the end of which they are deposited in a stand-by position 35 until they are picked up by lifting bars 16 to 18 and deposited on rollers 11 and 12. A limit switch, not shown, is thereby engaged which starts the downward movement of tool slides 14' and thereby brings the upper rollers 13 of all slide elements 5 to 8 into engagement with pipe 33. Rollers 11 and 12 are preferably continuously driven so that the pipe will start to rotate as soon as it comes to rest upon them. A positive driving force will then be exerted by rollers 11 and 12 as soon as the upper rollers 13 exert a resilient pressure upon the pipe and wedge the pipe between the two rollers 11 and between the two rollers 12 on slide elements 6 and 7 and the two single supporting rollers on each of slide elements 5 and 8. The speed of the driven rollers 11 and 12 between which the pipe is thus clamped is adjustable to correspond to the required cutting speed. Thus, pipes of a large diameter are driven at a low speed, while those of a small diameter are driven at a high speed. Thereupon, the two chucks 28 are moved toward the ends of the pipe and clamped thereto to prevent the pipe from moving in the longitudinal direction.

After pipe 33 has thus been clamped by the resilient pressure of rollers 13, tool slides 14' of all slide elements 5 to 8 continue to move downwardly so that cutting tools 14 start to cut into pipe 33. Tool holders 14'' may, however, also be provided with a feed separately from that of tool slides 14'. In this event, as soon as pressure rollers 13 exert a sufficient pressure upon pipe 33 under the action of springs 25 and 26, shafts 13' on which these rollers are mounted are thereby pushed upwardly relative to tool slides 14' and engage a limit switch to stop the further progress of the tool slides and to start the downward feed of tool holders 14'' so that cutting tools 14 will start to cut into pipe 33. Cutting tools 14 on the two central slide elements 6 and 7 are preferably adjusted so as slightly to precede cutting tools 14 on the two outer slide elements 5 and 8 so that the central pipe section will be cut off before the two deformed pipe ends which are gripped by chucks 28 are cut off from the outer pipe sections.

After cutting tools 14 have started to cut into pipe 33, electromagnets 30 are deenergized to release chamfering blades 15 which are then pressed by springs 31 against the cut edges of the pipe which are thus chamfered. After cutting tools 14 have cut through the pipe, chamfering blades 15 are retracted by magnets 30 and cutting tools 14, as well as pressure rollers 13, are likewise retracted either first by a return movement of tool holders 14″ and then by the return movement of tool slide 14′ or merely by the latter. Simultaneously herewith, chucks 28 release the pipe and move back to their starting positions, so that the individual pipe sections are now entirely free and merely resting loosely on rollers 11 and 12.

The pipe sections are then moved transversely by lifting bars 16, 17, and 18 which deposit the sections upon conveying rollers 20 and 21 in the position 34. Simultaneously with this movement lifting bars 16 and 17 also pick up from the stand-by position 35 at the end of guide bars 32 a new pipe which has previously been cut off from the continuous supply furnished by the pipe-making machine and has then been tested for leaks in the pipe-testing press adjacent to the pipe-dividing machine. The pipe sections are finally discharged from the dividing machine towards one side or the other by the movement of rollers 20 and 21. The newly supplied pipe is then divided into sections in the same manner as above described.

The three pipe sections then run successively against a stop, not shown. An arm operated by electromagnets then throws the respective pipe section engaging with the stop off the conveying rollers and upon delivery rails or other conveying means which may then lead the pipe sections to a further machine tool, for example, to a machine for cutting screw threads upon the ends of the pipe sections.

Conveying rollers 20 and 21 may be disposed within an inclined plane or two different inclined planes so that the pipe sections thereon will run off either in one direction or in opposite directions. These conveying rollers may, however, also be provided with driving means, and especially rollers 20 are preferably driven by motors 20′. If the finished pipe sections are not to be supplied or cannot be immediately supplied to a subsequent machine tool, collecting pockets or the like, not shown, may be provided underneath a part of the delivery rails for each pipe section which forms a bridge over the respective pocket and may be temporarily removed or pivoted laterally so that the respective pipe section will drop into the pocket.

In consonance with the foregoing description of FIGURES 1 to 4 inclusive, the flow diagram of FIGURE 5 shows diagrammatically a rolling mill and a pipe cutter which severs the length of pipe 33 shown in the uppermost part of the figure. Further diagrammatically shown is the pipe testing press to which the pipe length 33 is transferred as previously described, the press being designated in this figure by reference numerals 36. Parallel to the press 36 is a diagrammatic representation of the pipe dividing machine including the chucks 28 driven by motors 28; this portion of the figure indicating the cut sections of pipe 33′, 33″ and 33‴. Finally, the lower portion of the figure represents the position of the cut sections as transferred to the rollers 20 and 21. The direction of transfer from position to position of the pipes 33, 33′, 33″ and 33‴ is indicated throughout FIGURE 5 by arrows.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A method for producing pipes in a continuous cycle comprising the step of substantially continuously forming a continuous length of pipe, said step including the formation of a predetermined length of said pipe during a predetermined time interval, the further step of chopping said predetermined length of pipe from the above-referred to continuous length of pipe, said predetermined length of pipe being somewhat longer than the sum of the length of a plurality of pipe sections of shorter length, additional steps comprising the steps of moving said predetermined length of pipe to a dividing position by conveying said length of pipe in a direction tranverse to the direction represented by a longitudinal axis of the pipe prior to its being severed, dividing said predetermined length of pipe into a plurality of pipe sections, substantially simultaneously with the preceding step severing from said predetermined length of pipe its two ends, and conveying said pipe sections from the dividing position in a direction transverse to the direction of a longitudinal axis of the pipe in its dividing position, each of said additional steps being performed successively in a period of time no greater than that of said time interval.

2. A method of producing pipes in a continuous cycle comprising the step of substantially continuously forming a continuous length of pipe, said step including the formation of a predetermined length of said pipe during a predetermined time interval, the further step of quickly severing said predetermined length of pipe from said continuous length of pipe, the additional steps of conveying said predetermined length of pipe in a direction transverse thereto to a position laterally adjacent and parallel to the position occupied by said predetermined pipe length upon said severing thereof, subjecting said predetermined length of pipe to a pressure test, again conveying said predetermined length of pipe in a tranverse direction to a dividing position adjacent and parallel to said first-named position, dividing said predetermined length of pipe into a plurality of sections and simultaneously severing therefrom its two ends, and conveying said pipe sections from their dividing position in a direction transverse thereto, each of said additional steps being performed in a period of time no greater that that of said time interval.

3. A method as defined in claim 1, said additional steps further comprising the steps of depositing said pipe sections in a position adjacent and parallel to their previous dividing position, and then conveying said sections away in their longitudinal direction.

4. A method as defined in claim 1, said additional steps further comprising the step of chamfering the outer edges of the partly severed pipe sections while said predetermined length of pipe is being divided into said sections.

References Cited by the Examiner

UNITED STATES PATENTS

| | | | |
|---|---|---|---|
| 800,649 | 10/05 | Hurd | 82—85 |
| 1,085,946 | 2/14 | Seeley et al. | 82—101 XR |
| 1,278,857 | 9/18 | Clark et al. | 82—95 |
| 1,484,023 | 2/24 | Hayter | 82—4 XR |
| 2,003,118 | 5/35 | Mirfield et al. | 29—33 |
| 2,176,365 | 10/39 | Skinner et al. | 207—1 |
| 2,177,104 | 10/39 | Gonser | 113—120 |
| 2,272,179 | 2/42 | Allardt | 82—102 XR |
| 2,313,860 | 3/43 | Bogue | 83—13 |
| 2,536,066 | 1/51 | Krueger | 83—13 |
| 2,728,327 | 12/55 | Benninghoff et al. | 121—1 |
| 2,903,934 | 9/59 | Montgolf et al. | 82—83 |
| 2,959,849 | 11/60 | Rubin | 113—33 |

FOREIGN PATENTS 538,445   8/41   Great Britain.

WILLIAM W. DYER, JR., *Primary Examiner.*

THOMAS E. BEALL, RICHARD H. EANES, JR., *Examiners.*